US008276696B2

(12) United States Patent
Lucas

(10) Patent No.: US 8,276,696 B2
(45) Date of Patent: Oct. 2, 2012

(54) STRUCTURAL BATTERY DUCT ASSEMBLY

(75) Inventor: Marc Lucas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 12/844,149

(22) Filed: Jul. 27, 2010

(65) Prior Publication Data

US 2011/0139526 A1     Jun. 16, 2011

(51) Int. Cl.
    *B60K 11/00* (2006.01)
(52) U.S. Cl. ........................... 180/68.2; 180/68.5
(58) Field of Classification Search ............ 180/68.1, 180/68.2, 68.5
    See application file for complete search history.

(56) References Cited

U.S. PATENT DOCUMENTS

| 5,490,572 | A | * | 2/1996 | Tajiri et al. ............ 180/65.1 |
| 6,547,020 | B2 | | 4/2003 | Maus et al. |
| 2008/0196957 | A1 | | 8/2008 | Koike et al. |
| 2009/0260905 | A1 | * | 10/2009 | Shinmura ............ 180/68.1 |

FOREIGN PATENT DOCUMENTS

| JP | 2007203912 A | 8/2007 |
| JP | 2009035094 A | 2/2009 |

* cited by examiner

*Primary Examiner* — Jeffrey J Restifo
*Assistant Examiner* — Erez Guari
(74) *Attorney, Agent, or Firm* — David B. Kelley; Brooks Kushman P.C.

(57) ABSTRACT

A vehicle includes a cabin, a trunk area, a seating area located forward in the vehicle with respect to the trunk area, and a high voltage traction battery packaged in the trunk area. An electric motor is powered by the traction battery. A forced air system includes an inlet duct/inlet plenum arrangement for receiving air and providing air to the high voltage traction battery, an outlet duct for directing exhaust air from the high voltage traction battery, and a fan. At least one of the inlet duct / inlet plenum arrangement and the outlet duct forms a cross brace for the vehicle. The cross brace is located in the trunk area and extends between opposite sides of the vehicle to function as a structural member to provide structure and protect the high voltage traction battery.

15 Claims, 2 Drawing Sheets

STRUCTURAL BATTERY DUCT ASSEMBLY

BACKGROUND

1. Technical Field

The invention relates to a vehicle including a high voltage traction battery packaged in the trunk, such as a battery electric vehicle or a hybrid electric vehicle.

2. Background Art

In a battery electric vehicle, the vehicle may be plugged-in to an electrical supply to charge the high voltage traction battery. The vehicle includes a charger to convert household or industrial power supply alternating current (AC) to high voltage (HV) direct current (DC) to charge the high voltage battery.

In one example of an existing hybrid electric vehicle, a hybrid electric vehicle powertrain includes a vehicle system controller (VSC), an internal combustion engine, a traction battery, and a transmission including a motor-generator subsystem. These components form a powersplit powertrain, and the VSC may control the components in an attempt to maximize fuel economy. In a plug-in hybrid electric vehicle, the vehicle may be plugged-in to an electrical power supply to charge the high voltage traction battery. Similar to a battery electric vehicle, the plug-in hybrid electric vehicle includes a charger to convert household or industrial power supply alternating current (AC) to high voltage (HV) direct current (DC) to charge the high voltage battery.

Hybrid and/or battery electric powertrains are often the heaviest variant on a vehicle platform. Electrified vehicles may have additional structural upgrades such as cross car beams and/or floor to shock tower brackets. These added components are difficult to package without affecting cargo volumes and interior package targets.

Background information may be found in US2008/0196957A1, JP2009-035094, JP2007-203912A2, and U.S. Pat. No. 6,547,020.

SUMMARY

It is an object of the invention to provide upgrading of existing hardware/components to provide the additional function of structure that may prevent complex and costly parts being installed in the vehicle and realize better cargo accommodation for the customer.

In one embodiment, a vehicle comprises a high voltage traction battery, and an electric motor powered by the traction battery. A forced air system includes an inlet duct/inlet plenum arrangement for receiving air and providing air to the high voltage traction battery, an outlet duct for directing exhaust air from the high voltage traction battery, and a fan. At least one of the inlet duct/inlet plenum arrangement and the outlet duct is configured as a structural member to provide structure and protect the high voltage traction battery.

At the more detailed level, embodiments of the invention may incorporate one or more additional contemplated features. For example, the inlet duct/inlet plenum arrangement may be composed of a pair of inlet ducts located on opposite sides of the vehicle, and an inlet plenum extending between the inlet ducts. The inlet plenum may include a plurality of openings for providing air to the high voltage traction battery cells.

The inlet duct/inlet plenum arrangement and/or the outlet duct may be made of steel, and configured to provide a cross brace for the vehicle. In more detail, the vehicle includes a floor, and a pair of shock towers on opposite sides of the vehicle. The inlet duct/inlet plenum arrangement may be attached to the pair of shock towers, and to the floor.

In another embodiment, a vehicle comprises a cabin, a trunk area, and a seating area located forward in the vehicle with respect to the trunk area. A high voltage traction battery is packaged in the trunk area. An electric motor is powered by the traction battery.

A forced air system includes an inlet duct/inlet plenum arrangement for receiving air and providing air to the high voltage traction battery, an outlet duct for directing exhaust air from the high voltage traction battery, and a fan. At least one of the inlet duct/inlet plenum arrangement and the outlet duct forms a cross brace for the vehicle. The cross brace is located in the trunk area and extends between opposite sides of the vehicle to function as a structural member to provide structure and protect the high voltage traction battery.

In yet another embodiment, a vehicle comprises a high voltage traction battery, and a forced air system. The forced air system includes an inlet duct/inlet plenum arrangement for receiving air and providing air to the high voltage traction battery, an outlet duct for directing exhaust air from the high voltage traction battery, and a fan. At least one of the inlet duct/inlet plenum arrangement and the outlet duct forms a cross brace for the vehicle.

It is appreciated that embodiments of the invention provide many advantages. For example, in some embodiments, battery inlet ducts and the inlet plenum are utilized as structural members. It is appreciated that embodiments of the invention apply to air cooled batteries; vehicles may be, for example; hybrid, plug-in, or battery electric. Many variations are possible. For example, at least one of the inlet duct/inlet plenum arrangement and the outlet duct forms a cross brace for the vehicle and/or is configured as a structural member to provide structure and protect the battery internals. As well, the structural member may be made of, for example, steel, aluminum, carbon fiber or some other suitable material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention comprehends modifying the design of the hybrid battery inlet and/or exhaust ducts and inlet/exhaust plenum traditionally manufactured from plastic to provide the structure of a cross brace/support bracket. Such a duct/plenum could be manufactured from steel and attach to the two shock towers and the floor. There is minimal package space available for a cross car brace due to the large cross-sectional area of the ducts—this concept uses existing hardware (ducts and plenum) to provide the structure which results in a better package for the occupant and less components to manufacture.

Advantageously, less parts may provide a more efficient package. Some of the contemplated arrangements also give better cargo accommodation to the customer.

Further, it is appreciated that embodiments of the invention may be employed in any vehicle including a high voltage traction battery packaged in the trunk, such as a battery electric vehicle or a hybrid electric vehicle.

Figure 1:
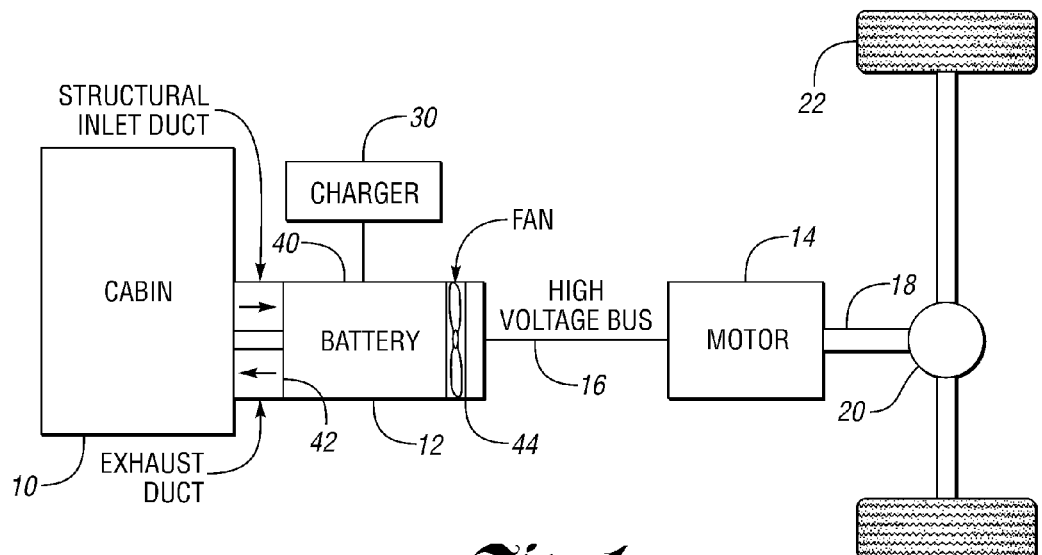
FIG. 1 is a schematic representation of a battery electric vehicle system configuration, including a structural battery duct assembly in an embodiment of the invention.

A schematic representation of a battery electric vehicle system configuration is shown in FIG. 1. The vehicle includes cabin 10, high voltage traction battery 12, and electric motor 14. The battery 12 is connected to the electric motor 14 by a high voltage bus 16. In one possible arrangement, an inverter connected to battery 12 converts DC to AC, and electric motor 14 is connected to a high voltage AC bus. Electric motor 14 drives output shaft 18 which is drivably connected through a differential and axle mechanism 20 to wheels 22. The electric motor 14 may be operated in a variety of ways as is appreciated by those skilled in the art. In general, a vehicle system controller (VSC) (not shown) calculates the required motor output, and controls electric motor 14 in an appropriate fashion.

A charger 30 is connected to the battery 12 and converts alternating current (AC) to high voltage direct current (DC) to charge the battery 12 when the charger 30 is plugged into an alternating current (AC) power supply, which may be a standard household or industrial power supply.

The vehicle further includes a forced air system including an inlet duct 40 receiving air and providing air to the high voltage traction battery 12, and an outlet duct 42 directing exhaust air from the high voltage traction battery 12. A fan 44 forces the air. In this embodiment, inlet duct 40 is configured as a structural member to provide structure and protect the high voltage traction battery. It is appreciated that embodiments of the invention may be configured with structural inlet and/or exhaust duct/plenum components.

Figure 2:
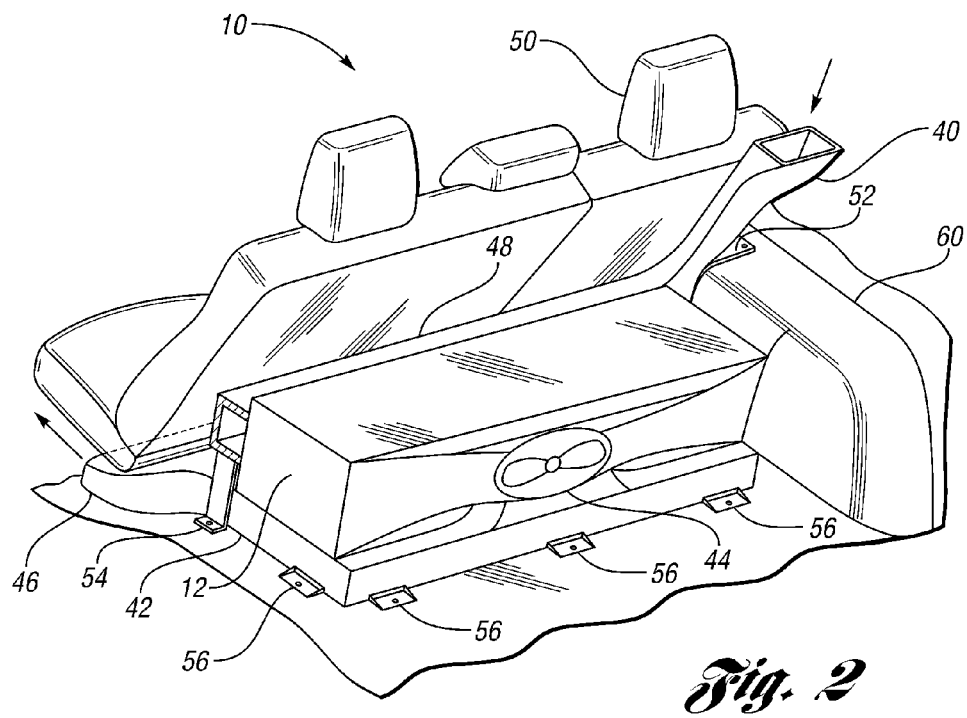
FIG. 2 illustrates a structural battery inlet and/or exhaust duct assembly in an embodiment of the invention.

The structural battery inlet and/or exhaust duct assembly is further illustrated in FIG. 2. As shown, the traction battery 12 is packaged in the trunk area, and a seating area located forward in the vehicle with respect to the trunk area includes a seat 50. The structural inlet duct 40/inlet plenum 48 compose an arrangement for receiving air and providing air to the traction battery 12. The inlet duct 40/inlet plenum 48 arrangement forms a cross brace for the vehicle, located in the trunk area and extending between opposite sides of the vehicle.

In more detail, the structural inlet duct 40 is secured to the vehicle body at mount 52, and is attached to the vehicle floor by mounting feet 54. The structural exhaust duct/plenum is indicated at 42 and secured to the floor by mounting feet 56, while a plastic exhaust duct extension is indicated at 46. Also shown in FIG. 2 is the wheel house 60.

Figure 3:
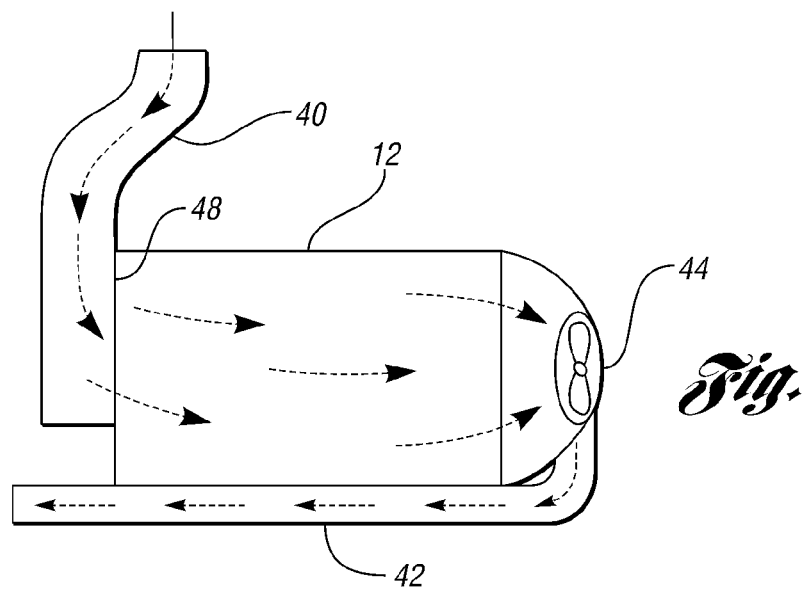
FIG. 3 illustrates a cross-section of the structural battery inlet and/or exhaust duct assembly of FIG. 2.

Referring to FIG. 3, a cross-section of the structural battery duct assembly of FIG. 2 is shown. The inlet duct 40/inlet plenum 48 arrangement receives air from the cabin 10, provides the air to the traction battery 12, and the air is exhausted through exhaust duct/plenum 42, with the air flow being forced by fan 44.

In the implementation shown in FIGS. 2 and 3, advantageously, the battery inlet ducts and inlet plenum and exhaust duct/plenum, traditionally manufactured from plastic, are modified to provide the structure of a cross brace/support bracket. The structural components may be manufactured from steel, and attached to the two shock towers and the floor.

As shown, a pair of inlet ducts located on opposite sides of the vehicle are provided, with the inlet plenum 48 extending between the inlet ducts 40.

Figure 4:
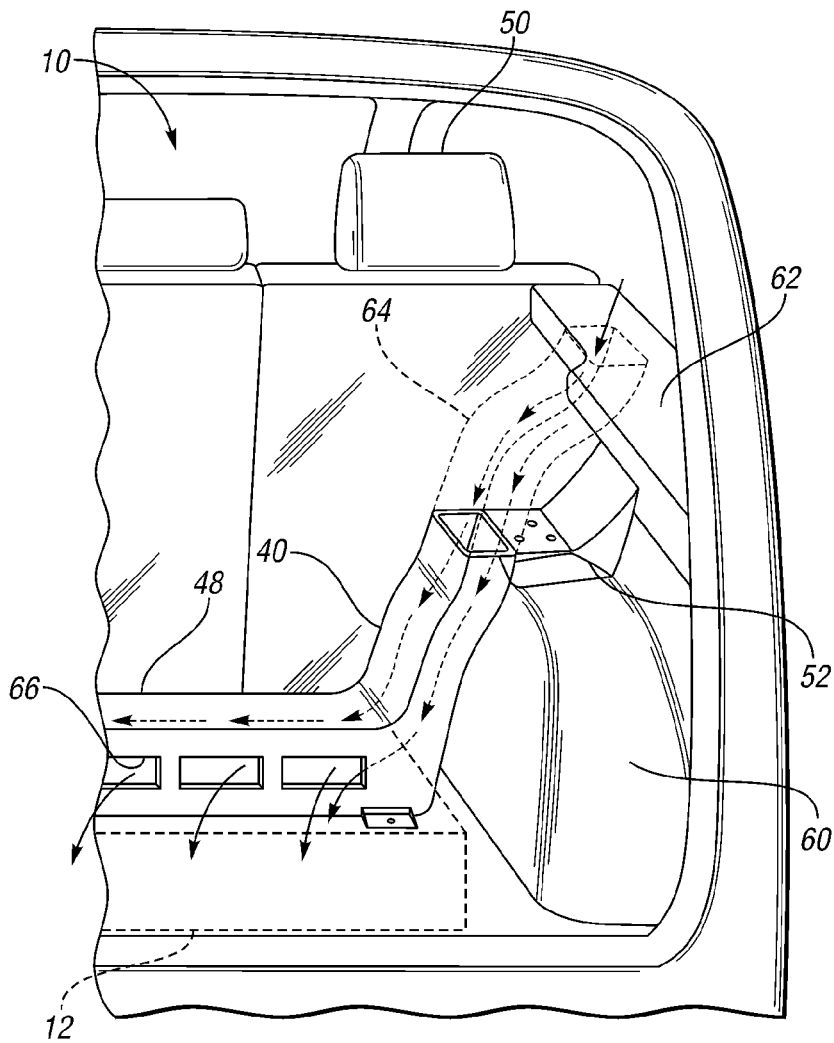
FIG. 4 illustrates a structural battery inlet duct assembly in another embodiment of the invention.

A structural battery duct assembly in another embodiment of the invention is illustrated in FIG. 4. As shown, the cabin is indicated at 10, and the seating area including seat 50 is located in front of the trunk area, where the traction battery is packaged. Structural inlet duct 40/inlet plenum 48 arrangement forms a cross brace for the vehicle, located in the trunk area, and extending between opposite sides of the vehicle to function as a structural member. The inlet plenum 48 includes a plurality of openings 66 for providing air to the high voltage traction battery 12. Also shown in the embodiment of FIG. 4, are package tray support 62 and plastic duct extension 64.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A vehicle comprising:
a high voltage traction battery;
an electric motor powered by the traction battery;
a pair of shock towers on opposite sides of the vehicle;
a forced air system including an inlet duct/inlet plenum arrangement attached to the pair of shock towers and for receiving air and providing air to the high voltage traction battery, an outlet duct for directing exhaust air from the high voltage traction battery, and a fan; and
wherein at least one of the inlet duct/inlet plenum arrangement and the outlet duct is configured as a structural member to provide structure, protect the high voltage traction battery, and provide a cross brace for the vehicle.

2. The vehicle of claim 1 wherein the inlet duct/inlet plenum arrangement comprises:
a pair of inlet ducts located on opposite sides of the vehicle; and
an inlet plenum extending between the inlet ducts.

3. The vehicle of claim 2 wherein the inlet plenum includes a plurality of openings for providing air to the high voltage traction battery.

4. The vehicle of claim 1 wherein at least one of the inlet duct/ inlet plenum arrangement and the outlet duct is made of steel.

5. The vehicle of claim 1 further comprising a floor, wherein the inlet duct/inlet plenum arrangement is also attached to the floor.

6. The vehicle of claim 1 wherein the inlet duct/ inlet plenum arrangement comprises:
a pair of inlet ducts located on opposite sides of the vehicle; and
an inlet plenum extending between the inlet ducts.

7. The vehicle of claim 1 wherein at least one of the inlet duct/inlet plenum arrangement and the outlet duct is made of steel.

8. A vehicle comprising:
a trunk area;
a seating area located forward in the vehicle with respect to the trunk area;
a high voltage traction battery packaged in the trunk area;
an electric motor powered by the traction battery;
a pair of shock towers on opposite sides of the vehicle;

a forced air system including an inlet duct/inlet plenum arrangement attached to the pair of shock towers and for receiving air and providing air to the high voltage traction battery, an outlet duct for directing exhaust air from the high voltage traction battery, and a fan; and wherein at least one of the inlet duct/inlet plenum arrangement and the outlet duct forms a cross brace for the vehicle, the cross brace being located in the trunk area and extending between opposite sides of the vehicle to function as a structural member to provide structure and protect the high voltage traction battery.

9. The vehicle of claim 8 further comprising a cabin, wherein the inlet duct/inlet plenum arrangement is configured to receive air from the cabin.

10. The vehicle of claim 8 wherein the inlet duct/inlet plenum arrangement comprises:

a pair of inlet ducts located on opposite sides of the vehicle; and an inlet plenum extending between the inlet ducts.

11. The vehicle of claim 10 wherein the inlet plenum includes a plurality of openings for providing air to the high voltage traction battery.

12. The vehicle of claim 8 wherein at least one of the inlet duct/inlet plenum arrangement and the outlet duct is made of steel.

13. The vehicle of claim 10 further comprising a floor, wherein the inlet duct/inlet plenum arrangement is also attached to the floor.

14. A vehicle comprising:

a high voltage traction battery;

a pair of shock towers on opposite sides of the vehicle;

a forced air system including an inlet duct/inlet plenum arrangement attached to the pair of shock towers and for receiving air and providing air to the high voltage traction battery, an outlet duct for directing exhaust air from the high voltage traction battery, and a fan; and wherein at least one of the inlet duct/inlet plenum arrangement and the outlet duct forms a cross brace extending between opposite sides the vehicle to function as a structural member to provide structure and protect the high voltage traction battery.

15. The vehicle of claim 14 further comprising a floor, wherein the inlet duct/inlet plenum arrangement is also attached to the floor.

* * * * *